(12) United States Patent
Howell

(10) Patent No.: US 8,069,258 B1
(45) Date of Patent: *Nov. 29, 2011

(54) LOCAL FRAME PROCESSING TO APPARENTLY REDUCE NETWORK LAG OF MULTIPLAYER DETERMINISTIC SIMULATIONS

(75) Inventor: Jeffrey Howell, Burnaby (CA)

(73) Assignee: Electronic Arts Inc., Redwood City, CA (US)

( * ) Notice: Subject to any disclaimer, the term of this patent is extended or adjusted under 35 U.S.C. 154(b) by 1089 days.

This patent is subject to a terminal disclaimer.

(21) Appl. No.: 11/853,791

(22) Filed: Sep. 11, 2007

(51) Int. Cl.
*G06F 15/16* (2006.01)
(52) U.S. Cl. .......................... 709/230; 463/42
(58) Field of Classification Search .................. 709/227, 709/230; 463/42
See application file for complete search history.

(56) References Cited

U.S. PATENT DOCUMENTS

| | | | | |
|---|---|---|---|---|
| 4,570,930 | A * | 2/1986 | Matheson | 463/41 |
| 5,974,442 | A * | 10/1999 | Adams | 709/200 |
| 6,326,963 | B1 * | 12/2001 | Meehan | 345/419 |
| 2002/0128065 | A1 * | 9/2002 | Chung et al. | 463/42 |
| 2003/0117397 | A1 * | 6/2003 | Hubrecht et al. | 345/420 |
| 2007/0060359 | A1 * | 3/2007 | Smith | 463/42 |

* cited by examiner

*Primary Examiner* — Andrew Caldwell
*Assistant Examiner* — Ryan Jakovac

(57) ABSTRACT

A method for at least apparently reducing the effects of network lag is provided. For a networked interactive game system including at least one local game system and at least one remote game system, distributed game play of an interactive game with at least an apparent reduction of network lag at the local game system is allowed. An input command which was generated by a local user of the local game system that controls a local object is intercepted. Furthermore, at least state data of a remote object that was determined in a network simulation of a previous game frame is retrieved. Interaction data of the local object for a local simulation of an immediately previous game frame may also be retrieved. A local simulation of the first game frame is generated based on the input command, the state data, and the interaction data.

20 Claims, 5 Drawing Sheets

LOCAL FRAME PROCESSING TO APPARENTLY REDUCE NETWORK LAG OF MULTIPLAYER DETERMINISTIC SIMULATIONS

FIELD OF THE INVENTION

The present invention relates to interactive applications. More particularly, the present invention relates to local frame processing to apparently reduce network lag of multiplayer deterministic simulations.

BACKGROUND OF THE INVENTION

In most video games, a game engine runs according to the rules of the game taking into account user input and presenting an animated display that is responsive to the user input. For example, if the user presses a button that is a "jump" button according to the game rules, then the game engine would animate a character such that it appears to jump. The display of a video game is generally a video sequence presented to a display capable of displaying the video sequence. The video sequence typically comprises a plurality of frames. By showing frames in succession in sequence order, simulated objects appear to move. The game engine typically generates frames in real-time response to user input for non-networked game play, so rendering time is often constrained. As used herein, "frame" refers to an image of the video sequence.

Online video games and other interactive applications can involve multiple users who interact or communicate with each other. There is a demand to produce interactive video games with real-time capabilities for networked game play, that timely respond to a user's inputs such that the user's movement of a joystick causes a character in a scene to move and the movement appears to the user to be in real-time.

An issue for real-time systems in the context of networked game play is network latency. Network latency is the time required to deliver network packets from one node within the network to another node. In a client-server model, one host on the network, the server, acts as a central communications hub for all the other hosts or clients. Typically the server is authoritative, and is responsible for routing communication between the several clients. All game play information must first be communicated to the server before being relayed back to the client nodes. In these systems, each client node sends out user input signals to the server. The server collects user input data from all participating nodes, generates a simulation and/or state information of the objects within the game, and delivers the results to each client node. The back-and-forth communication and server-side processing required for each frame of the game can create problems that prevent the game from playing sufficiently fast. Essentially, all of the client nodes must wait for the simulation information to be provided by the server. The communications between the server and client(s) are also subject to network latency.

In the peer-to-peer networking topology, the client nodes in the network communicate directly with one another. Peer-to-peer applications largely distribute the responsibility for the simulation or application among the peers. Essentially, each peer node performs the same simulation as the other peer nodes. By performing the simulations locally, the peer nodes are not dependent on the simulation processing performed by the server of the client-server model. As a consequence of moving the responsibility of generating the simulations on the local systems, this topology requires synchronization to ensure the states between the peer nodes are in harmony. Typically, the synchronization of game states among the peer nodes necessitates the local node to generate a simulation for a particular frame only when inputs from all peer nodes are received for that frame. Thus, each peer node must wait for communication of input signals by other peers. Moreover, the communications between the peer nodes are also subject to network latency. To the extent network latency is noticeable to a user, real-time interactivity is impaired. Ideally, the user should not perceive any network lack of responsiveness.

In any networking scenario, the sending and receiving of inputs for each frame can produce large amounts of network traffic. Networks however have a limited capacity to convey information, and multiple computers and applications must share that limited resource. For example, networks such as the Internet connect several computers with network links having a limited bandwidth that is shared among the many computers, each of which wants to maximize its usage of available bandwidth. When attempted data rates exceed the network capacity to convey that data, the network congests and the effective network capacity becomes a small fraction of the theoretical capacity, producing network latency. Where latency is significant, interactive video games are impractical and interactions between users across the network are significantly degraded.

BRIEF SUMMARY OF THE INVENTION

In accordance with an embodiment of the invention, systems and methods for at least apparently reducing the effects of network lag is provided. For a networked interactive game system including at least one local game system and at least one remote game system, distributed game play of an interactive game with at least an apparent reduction of network lag at the local game system is allowed. An input command which was generated by a local user of the local game system that controls a local object is intercepted. Furthermore, at least state data of a remote object that was determined in a network simulation of a previous game frame is retrieved. A network simulation at least determines interactions of nondeterministic objects from at least two game systems for use in at least one of game processing and display. Interaction data of the local object for a local simulation of an immediately previous game frame may also be retrieved. A local simulation at least determines interactions of objects in order to generate at least one of game processing and display for use at the local game system. A local simulation of the first game frame is generated based on the input command, the state data, and the interaction data.

In one embodiment, the processing flow of the input commands includes running multiple simulations of each frame on a local node. A simulation is a computer process which takes into account game state information of various objects both locally-controlled and remotely-controlled, user input, and game rules to determine a new game state and/or interaction information. Two simulations, a local simulation and a network simulation, may run asynchronously for a single frame, each frame corresponding to a single time phase within the game.

The local simulation of a frame in the game incorporates the local player's commands, for example to move a character in the game. These movements are made in a time period ahead of other objects in the game. In other words, the movements of the locally-controlled character are responsive to the real-time user inputs and are measured against the state of the game universe at a previous frame in the game. The local simulation of the local object for the frame is then rendered and displayed to the local user. Additionally, the network simulation of the remote object for a previous frame is also rendered and displayed to the local user. By rendering both the local object and the remote object as described herein, the local game player views the rendered and displayed game frame as being responsive to the input commands in real-time.

In some embodiments, collision detection is performed during the generation of the local simulation of the game frame. The resulting collision/interaction data determined. However, a response to the collision data is not provided until a local simulation is performed for a next frame in the game. In order to prevent synchronization errors, response to the interaction data is not provided in the current game frame.

A network simulation is also generated for the same frame. Whereas the local simulation is based on a combination of data at a current frame and data at a previous frame, the network simulation is generated using the state, interaction data, and input commands of the local and remote players for the same frame.

Embodiments of the present invention can be made using computer hardware to implement the functionality, computer software comprising program code made up of instructions that, when executed, perform that functionality, or some combination. The computer software can be special-purpose game hardware or a general-purpose programmable device or system. The present invention can also be embodied on computer-readable media that, when combined with a computer or computing device, implements the invention. Such media might include CD-ROM, DVD, or networked storage such as an Internet-connected file server.

In one embodiment, a computer readable medium that includes embodiments of the present invention is included.

The following detailed description together with the accompanying drawings will provide a better understanding of the nature and advantages of the present invention.

DETAILED DESCRIPTION OF THE INVENTION

A method for local frame processing to apparently reduce network lag of multiplayer deterministic simulations is described herein. It should be understood that the invention is not limited to a particular type of game hardware, but might apply to consoles, computers, handheld devices, cell phones capable of playing games, and other hardware. Game consoles are made be several vendors, such as Microsoft's Xbox 360™ console, Sony's PS3™ console, and Nintendo's Wii™ console, the portable DS, Sony's portable PSP™ device, and Apple's portable iPhone™ device.

The play of the game depends on what the player does, hence the game is interactive. An end user of an interactive video game is often referred to as a "player". That player is provided with user input devices to convey the user's inputs to an interactive video game. In one embodiment, a local player has authority over a local game object. The interactive video game also provides for outputs, such as a video display output and an audio output. Other outputs might also be present, such as a data transfer output (or input/output) for interacting with other game systems and/or storage and/or remote data systems, etc. It should be understood that the actual display is not required for the invention, but can be added to the invention when the user plays the game. For example, the invention might be embodied in instructions forming program code stored on computer-readable media programmed such that ordinary and/or readily available computers, computing devices, game consoles or other platforms can be provided with the program code and/or computer-readable media to provide the player with an interactive game playing experience.

In the description that follows, embodiments of the systems and methods of the invention will be described, in part, with reference to certain illustrated embodiments. These embodiments largely encompass examples of systems and methods suitable for allowing networked interactive applications, such as a networked video game. However, embodiments are not limited to any particular architecture, environment, application, or implementation. For example, although embodiments will be described in reference to gaming applications, the invention may encompass other applications and features including other applications where it will be beneficial to reduce the degrading effect of network lag. Moreover, embodiments will be described to the peer-to-peer networking topology. However, embodiments may include other network topologies, such as the client-server model. Therefore, the description of the embodiments that follows is for purposes of illustration and not limitation. Further details will be provided in reference to the figures described below.

Figure 1:
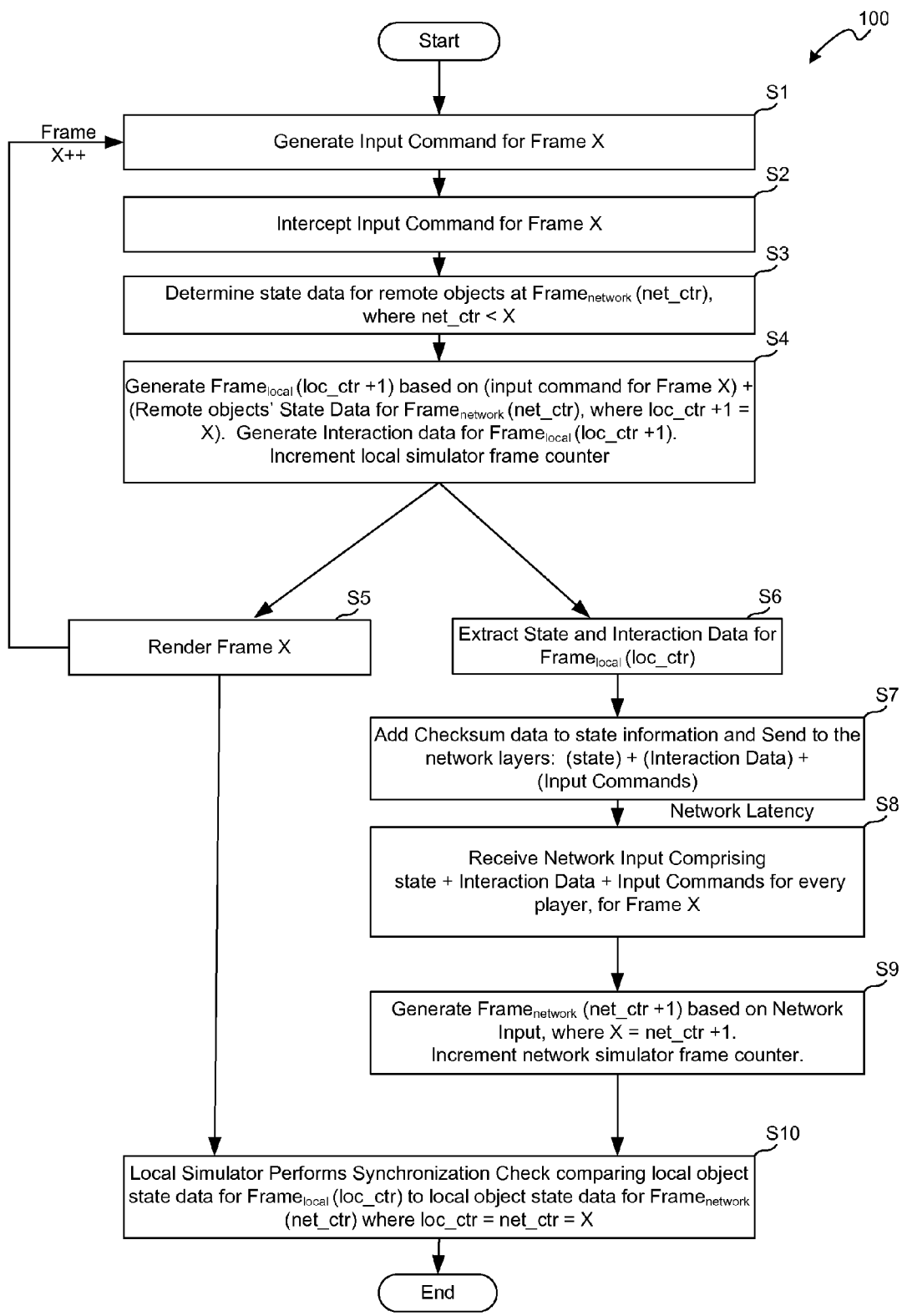
FIG. 1 is an exemplary process flow diagram 100 which illustrates one method of local frame processing to apparently reduce network lag of multiplayer deterministic simulations.

FIG. 1 is an exemplary process flow diagram 100 which illustrates one method of local frame processing to apparently reduce network lag of multiplayer deterministic simulations. The steps are labeled S1, S2, S3, but might be performed in an order other than the order of the labels. In one embodiment, the game system 100 is a local node connected to a peer-to-peer network. Flow 100 shows the process of generating multiple simulations of a frame within an interactive video game. In one embodiment, two distinct simulations are generated. A first simulation ("local simulation") is generated in real-time, using the local player's input commands for a next frame in the game play. After the simulation is performed, the frame is rendered and displayed to the local player using the locally simulated local game object. From the vantage point of the local player, the local player's game object appears to be instantaneously responsive to the input commands, even within the context of networked game play. A second simulation ("network simulation") is also performed for the same frame using state data, interaction data, and input commands of all the networked players within the game. Previous solutions require that a simulator generating the network simulation on a local player's game console to wait for input command signals from the remote game consoles within the network before rendering the frame on the players' video displays. In these systems, the wait time causes a noticeable delay between rendering of frames during game play. In one embodiment, the local simulation increases the gaming experience by diminishing the effects of network lag. The network simulation for the same frame is not rendered or displayed to the game player. Instead, the network simulation for the same frame is generated and the state information from the network simulation is used to perform synchronization checking against the local simulation. Thus, the local simulation enables real-time multiplayer gaming during networked game play and the network simulation enables the local simulation to remain in synchronization with the network.

In one embodiment, two distinct frame counters are used herein to identify frames in the local and network simulations. A local simulation frame counter, loc_ctr, identifies frames within the local simulation. For example, $Frame_{local}$ (loc_ctr), where loc_ctr equals the integer 5, represents the local simulation of Frame 5 of the video game. A network simulation frame counter, net_ctr, identifies frames within the network simulation. For example, $Frame_{network}$ (net_ctr), where net_ctr equals the integer 5, represents the network simulation of Frame 5 of the video game. In one embodiment, the local and network counters are both initialized to zero. As each frame is simulated by the local and network simulators, the corresponding frame counters are incremented.

In step S1, the local player's input command is generated for the next frame in the video game, denoted using universal frame counter Frame X, where X is a positive integer. An input command is any command provided by or determined from player input, such as controller data from a player's interaction with a game controller, a command to spawn a new player, and X, Y, Z coordinates of a game object.

Traditional distributed game play requires each local node to send the input signals of the local player to every other node in the network. In step S2, the input command for Frame X, which is the next frame to be rendered and displayed to local player, is intercepted prior to sending out to the remote nodes on the peer-to-peer network for distributed game play. In step S3, the state of the remote players' game objects are determined for the most recent network-simulated frame, denoted as $Frame_{network}$ (net_ctr). In one embodiment, state data includes many variables, such as current level, current health points, history of prior actions, current location, position (e.g., X, Y, Z coordinates, relative position), orientation, visual description of game objects, etc. Since the network simulation cannot be generated until all remote nodes in the distributed game play are received through the network notwithstanding network lag, the most recent network-simulated frame corresponds to a past time phase. As such, where network lag is present, net_ctr<X.

In step S4, $Frame_{local}$ (loc_ctr+1), where loc_ctr+1=X, is generated using the input command for Frame X and the state of the remote players' game objects for $Frame_{network}$ (net_ctr). In other words, the local simulation is generated for the next frame based on the local player's input commands for that frame and the last known state data of the remote players, corresponding to a previous frame of a previous time phase. By generating the local simulation of the next frame without waiting for the input commands from the remote players, the simulated local object can be displayed in real-time for Frame X. Moreover, during local simulation, the state of the local game object is determined for the simulated frame and is stored, for example, in a record. As will be described, the stored state information will be used for synchronization checking. In addition to state information, interaction data is also determined during the local simulation for the frame. Interaction data includes data about the interaction of the local game object with other objects or entities within the game. In one embodiment, the interaction data is stored in the local player's object data structure. One example of interaction data is collision data, which may be generated based on performing collision detection. Collision detection may be performed by a physics/animation engine.

In one embodiment, collision detection may involve examining intersections between the local character and a remote character (e.g., character-to-character collisions) or between characters and environmental objects (e.g., landscape artifacts such as a tree or railing bar). Other forms of collision detection may also be performed. Collision detection is determined using the positional values of the local objects and remote entities and/or environmental objects. Where a character-to-character collision is detected, the interaction data is proxied through the network. More specifically, the local simulation generates the character-to-character collision data and this collision data is saved into the local player's object data structure. As will be described in step S6, the proxy extracts and sends the interaction data to the network. In the next locally-simulated frame, the collision from the previous frame is then resolved. In one embodiment, the rendered collision is a frame behind the frame in which the collision was detected. By proxying and resolving the collision in a later frame rather than resolving the collision right away in the current frame, de-synchronization between the local and network simulations is prevented. For example, in a skateboarding game, after character-to-character collision detection, the interaction data may be "the leg of local player 2 contacted the foot of network player 3 at world position X,Y,Z." This collision information is stored in the local game object 2 data structure. The local simulation for Frame X does not act upon the collision data. It is not until the local simulation for Frame X+1 is generated that the collision data is acted upon by collision resolution. In this example, the local simulation for Frame X+1 may resolve the collision by "wiping-out" the local game object. Other methods of collision resolution may be performed, for example, by moving the skeleton of a hand of the local game object when colliding with another player's body. Thus, in one embodiment, $Frame_{local}$ (loc_ctr_+1) is generated using the input command for Frame X, the state of the remote players' game objects for $Frame_{network}$ (net_ctr), and the interaction/collision data from the previous local simulation $Frame_{local}$ (loc_ctr), where loc_ctr=X-1, for Frame X-1. When $Frame_{local}$ (loc_ctr+1) has been simulated, the simulation counter is incremented such that what was $Frame_{local}$ (loc_ctr+1) is now $Frame_{local}$ (loc_ctr).

In step S5, Frame X is rendered and displayed to the local player in the local video display. In one embodiment, the local simulation, which is now $Frame_{local}$ (loc_ctr), of the local object is rendered. Additionally, the network simulation of the remote object for $Frame_{network}$ (net_ctr) is also rendered. When the local object of the local simulation is rendered, the local simulation enhances the user experience by displaying the animations of a "ghosted" player as soon as the local player input commands are given. Thereafter, processing may loop back to step S1, where game commands for the next frame are generated. The universal frame counter is incremented after looping back, for example, by Frame X++.

Steps S6-S9 are specific to the network simulation. The network simulation and local simulation may run asynchronously for each frame. In step S6, the state and interaction data determined at S4 for the locally-simulated frame, now $Frame_{local}$ (loc_ctr), is extracted. In step S7, checksum data is determined and added to the extracted state information. The state (including the checksum), interaction data for the $Frame_{local}$ (loc_ctr) and input commands for Frame X are sent out to the network layers within the distributed gaming environment. Known methods of determining checksum data may be implemented without departing from the scope of the teachings herein. After the preceding information is sent out to the network, the local node must wait for network input from all network players before generating the network simulation. Network latency may cause the network input to become delayed.

In step S8, the local node receives network input from the network layers. The network input includes an aggregation of state data (including checksum), interaction data, and input commands for Frame X for each of the game objects (both remote and local).

In step S9, the network simulation for the same frame Frame X is generated, denoted $\text{Frame}_{network}$ (net_ctr+1), where X=net_ctr+1. The network simulation of Frame X is the second simulation. The local simulation for the same frame Frame X was performed at step S4. In one embodiment, the network simulation is based on the received network input. By running the network simulation, the states of all the game objects are determined for $\text{Frame}_{network}$ (net_ctr+1). In one embodiment, character-to-character collision detection is disabled prior to generating the network simulation. Although the "ghosted" player is represented in the network simulation, the character-to-character collision detection should be disabled in order to prevent the "ghosted" player from affecting and being affected by the state of other entities in the network simulation. By disabling the character-to-character collision detection in the network simulation, the local and remote players remain synchronized. In one embodiment, other forms of collision detection not including character-to-character collisions may be performed by the network simulation.

In one embodiment, the local client/node performs the same network simulation as a server (in a client-server network topology) or a peer (in a peer-to-peer network topology). As long as the client-controlled game object is not acted upon by forces on the server that do not exist on the client or vice versa, the client and server state information for the object will agree. Likewise, where the local peer-controlled game object is not affected by forces on the remote peer nodes that do not exist on the local peer node, the state information for the local and remote peers for the object remain synchronized. Once the network simulation is completed, the network frame counter is then incremented.

Synchronization checking is performed in step S10. The synchronization checking is performed in order to maintain unification among the states of the game objects within the game network. The stored state of the local game object for $\text{Frame}_{local}$ (loc_ctr) (as determined in S4) is compared to the state of the local game object for the network simulation at $\text{Frame}_{network}$ (net_ctr) for the same frame Frame X, where net_ctr=loc_ctr=X. If the states of the local game object for the same frame of the network simulation and local simulation match, processing ends. Otherwise, the network simulation and local simulation of the frame are not synchronized and a programming error has occurred. It may be possible to recover from programming errors by resetting the player's state within the local simulation to a known state (i.e., fresh spawn). Alternatively, the program code may cause a forced exit from game play. Other methods of synchronization error resolution may also be performed.

Figure 2:
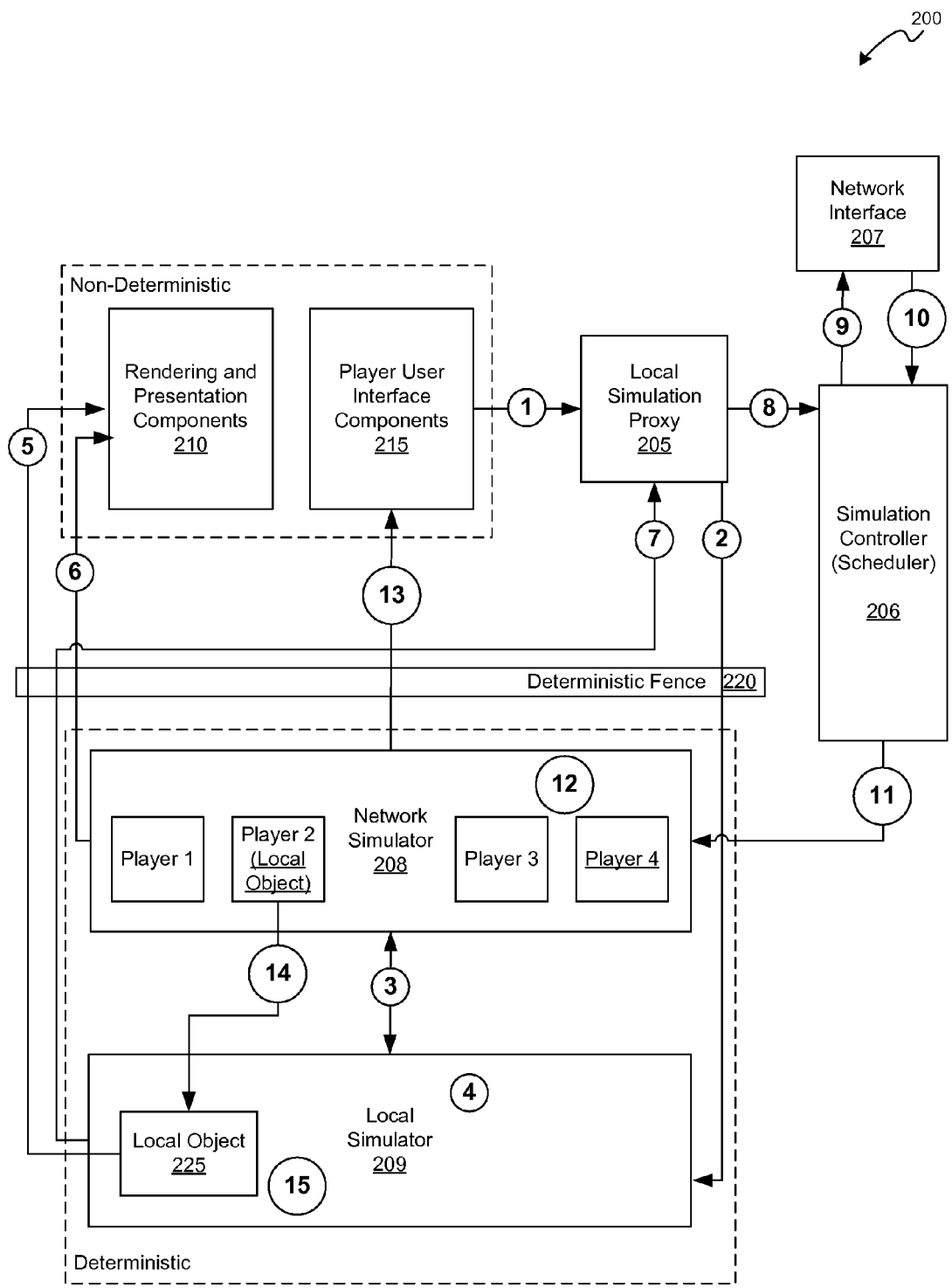
FIG. 2 illustrates a game system 200 according to an embodiment of the present invention.

FIG. 2 illustrates a game system 200 according to an embodiment of the present invention. Game system 200 includes rendering and presentation components 210, player user interface components 215, a network simulator 208, a local simulator 209, simulation controller (scheduler) 206, a local simulation proxy 205, and network interface 207. Deterministic fence 220 is a logical abstraction which will be described in more detail below. In one embodiment, game system 200 shows the process of generating multiple simulations of a frame within an interactive video game. In one embodiment, the game system 200 is a local node connected to a peer-to-peer network. Two distinct simulations are generated for a single frame; A local simulation and a network simulation are generated in the local node. In one embodiment, the local simulator and the network simulator are separate instances of a single simulation object. By rendering the locally-simulated local object, the local simulation enhances the user experience by displaying the animations of the "ghosted" player as soon as the user commands are given.

In one embodiment, save the network interface 207, game system 200 is a local node connected to a peer-to-peer network. The game command flow might begin when power is first supplied to game system 200, when it is reset or similar events. Program data of a game may be loaded. Thereafter, the game advances on the basis of the program data and player/user input provided by the game player via input devices of the player user interface components 215. Input devices may include game controllers to convey the player's inputs to the interactive video game for the next frame to be simulated and displayed to the player, denoted Frame X. As previously discussed, two simulations are generated for Frame X, a local simulation, $\text{Frame}_{local}$ (loc_ctr+1), and a network simulation, $\text{Frame}_{network}$ (net_ctr+1). In one embodiment, loc_ctr and net_ctr may be initialized to zero. The player input, such as to control movements of the local object of the interactive application, may be received by the local node. As used herein, player input is a broad term encompassing input provided by a player of the game.

At step 1, the proxy 205 intercepts the input commands. As previously mentioned, an input command is any command provided by or determined from player/user input, such as controller data from a player's interaction with a game controller. One example of an input command for Frame X may include "player pushed button A." In a typical peer-to-peer gaming environment, input commands are sent from player user interface components 215 to the simulation controller 206 for sending out to the other network nodes. In this embodiment, the proxy 205 intercepts these input commands before they reach the simulation controller 206.

At step 2, the proxy 205 sends the input commands for Frame X, to the local simulator 209 in order to generate the first of two simulations. The second simulation for the frame will be generated by the network simulator 208. The local and network simulations may occur asynchronously. At step 3, in order to generate the local simulation of the "ghosted" player, the local simulator 209 queries the network simulator 208 for the state information of the remote game objects. Since the local simulator does not wait for network signals for the remote object for Frame X before generating the simulation for that frame, the local simulation can simulate the local game object using the intercepted local object commands for Frame X and the last known state information for all other objects within the game universe, denoted by $\text{Frame}_{network}$ (net_ctr). In one example, the loc_ctr=3, where $\text{Frame}_{local}$ 3 has been simulated, and net_ctr=1, where $\text{Frame}_{network}$ 1 has been simulated. The last known state information of the remote object is determined from the latest network simulation, occurring in this example for $\text{Frame}_{network}$ 1. The network simulator 208 provides the requested state information for the remote object at $\text{Frame}_{network}$ 1.

At step 4, the first of two simulations are generated for the frame. More specifically, the local simulation is generated for the $\text{Frame}_{local}$ (loc_ctr+1), where loc_ctr+1=X. The proxy 205 executes the local input commands on the local simulation. The local simulation is also based on the state information for the remote game objects at $\text{Frame}_{network}$ (net_ctr). The local simulator 209 runs a standard simulation, including animation and collision detection. After running the local simulation, state data and interaction data for the $Frame_{local}$ (loc_ctr+1) are generated. The state data of the local object for the locally-simulated frame is saved in a repository accessible by the simulator 209. In one embodiment, the local object state data 225 is stored within the simulator 209. Interaction data includes data about the interaction of the local game object with other objects or entities within the game. Interaction data may include collision data which is based on performing collision detection. Other known forms of generating and collecting interaction data are also contemplated without departing from the scope of the embodiments provided herein. As previously described, peer-to-peer collision detection and other interaction detection are performed for the local simulation. Although the local simulation determines interaction data, the local simulator 209 does not act on collision/interaction data. The peer-to-peer collision data and other dynamic interaction that cannot be deterministically predicted are proxied through the local simulation proxy 205 into order to be resolved. Collision resolution does not occur until the next frame Frame X+1 is locally-simulated, so as to prevent de-synchronization between the local and network simulations. Thus, the local simulation can also based on interaction data for the local simulation of the previous frame, Frame X−1. The local simulator frame counter (loc_ctr) is incremented.

For example, the local simulation is generated based on the input command for the local game object at Frame 3 (where X=3) and the state information for the remote object(s) at $Frame_{network}$ 1 (where net_ctr=1). Network lag has caused a delay in generating the network simulations such that the next game frame to be displayed is ahead in time of the network-simulated frames. In an exemplary skateboarding game, interaction data that is generated as a result of running the simulation is "local object 2 hit remote object 1." This interaction data will be resolved in the local simulation of the next frame, Frame 4.

Frame X is then rendered. At step 5, the rendering and presentation components 210 render and display Frame X on the local node using the corresponding local simulation of the local object (i.e., local object data 225 from the local simulator 209 for $Frame_{local}$ (loc_ctr, where loc_ctr=X)). At step 6, the network simulation of the remote objects for $Frame_{network}$ (net_ctr) are also rendered and displayed for Frame X.

In a typical peer-to-peer gaming network, each local node sends out their local input commands to the peer nodes within the network in order to generate a simulation for the next frame of the video game. In the embodiments that follow, steps 7-12 describe the process of generating a network simulation for the frame in addition to the local simulation for the same frame. At step 7, the proxy 205 extracts from the local simulator 209 the state and interaction information for the local object which was generated while running the local simulation for $Frame_{local}$ (loc_ctr, where loc_ctr=X). In the skateboarding example, the proxy 205 and simulation controller 206 will convey state data and the interaction data "local object 2 hit remote object 1" to all remote nodes of the network.

At step 8, the proxy 205 forwards the state and interaction information (from step 7) and input commands for Frame X (from step 1) to the simulation controller 206. The simulation controller 206 adds checksum data to the state information and forwards the state, interaction information, and input commands for Frame X to the network interface at step 9. At step 10, the simulation controller 206 receives aggregate information from each network player, including state and interaction data from the local simulations performed by the remote nodes for the same frame, input commands for Frame X, and checksum. In most cases, the time between steps 9 and 10 is not instantaneous due to network lag. One benefit of the current embodiment which uses both local and network simulations is that the game player's commands are executed in real-time, without experiencing the effects of lag. In one embodiment, network latency may be tolerated to a maximum threshold value, for example, 1 second where 60 simulations are generated per second. The simulation controller 206 may manage the network lag threshold. Where the network lag is less than the threshold, the simulation controller 206 waits for the network to catch-up. Where the network lag exceeds the threshold, the simulation controller 206 may exit from the networked game play session. At step 11, the simulation controller 206 forwards the network input for Frame X to the network simulator 208.

The network simulation, denoted $Frame_{network}$ (net_ctr+1), where X=net_ctr+1, for Frame X is generated at step 12 based on the network input. The network frame counter, net_ctr, is then incremented. Since the states of the local object in the local simulation and remote simulation must remain in synchronization, interactions affecting the state of the local player which cannot be predicted may not be allowed. For example, character-to-character collision detection may be disabled in the second simulation, i.e., the network simulation. Custom collision filters may be added to filter out collisions involving the local object in the network simulation.

At step 13, the network simulator 208 optionally provides data that the player user interface components 215 may need from the network simulation, such as data that is needed to generate new input commands for $Frame_{network}$ (net_ctr+1). The data may also include other entities that are simulated in the network simulation. For example, a challenge system running the world state of the game may be present in the network simulator. As such, the challenge system may send data to the player user interface components 215 in order to instruct the local player to teleport to an X,Y,Z coordinate at the start of the race.

Steps 14 and 15 illustrate the process of synchronization checking Synchronization checking may be performed any time after both the local and network simulations have been generated for the same frame. Step 14, for example, may occur at the end of the network simulation, where the network simulator sends the local object state data for $Frame_{network}$ (net_ctr). At step 15, the local simulator 209 verifies that the saved record of the local object's state from the local simulation is the same as the state of the local object in the network simulation. In one embodiment, the local object state data 225 for $Frame_{local}$ (loc_ctr) is compared to the local object state data for $Frame_{network}$ (net_ctr) for the same frame Frame X, where loc_ctr=net_ctr=X. If the states are not in synchronization, a programming error has occurred. Various methods of synchronization error resolution may be performed.

In one embodiment, a synchronization checking system may be implemented having two functions. First, the sync checking system generates a local checksum for each frame as the frame is simulated. More specifically, checksums are generated by creating a cyclic redundancy check (CRC) value for all the variables in the state of an object. This creates a final integer value for the CRC fingerprint of the state of an object. Second, the sync checking system performs synchronization checking by performing an integer comparison of checksums to determine if the states of the local object are the same in both the local and network simulations. If the checksums do not match, a synchronization error has occurred. In debug builds, the variables in the state of the object are saved and in the event of a de-synchronization, the state of the objects may be debugged to a CRC log file. In one embodiment, the CRC log is dumped out on each of the local and remote machines. The difference of the log files may be examined to isolate the cause of the synchronization error.

In one embodiment, the deterministic fence 220 represents the logical split between non-deterministic and deterministic processing. On one side of the deterministic fence 220 are the rendering and presentation components 210 and player user interface components 215 which use non-deterministic input to generate input commands that can be sent out to the network. On the other side of the fence 220 are the network simulator 208 and the local simulator 209, both of which can simulate game commands deterministically. It should be noted that the inputs from step 2 and step 11 for the local and network simulations, respectively, provide input into the simulations in a deterministic manner. On the deterministic side of the fence 220, all input is provided by steps 2 and 11, and all outputs are provided across the fence 220. The proxy 205, simulation controller 206, and network interface 207 fall within a sliding scale between deterministic and non-deterministic.

In one embodiment, the peer-to-peer network may be implemented using a library of the Plasma software development kit (SDK) to setup the connection and send data back and forth between peers. Plasma may also handle match making, leader boards, achievements, and persistent storage for the interactive application. Other implementations of the network same may also be used.

Figure 3:
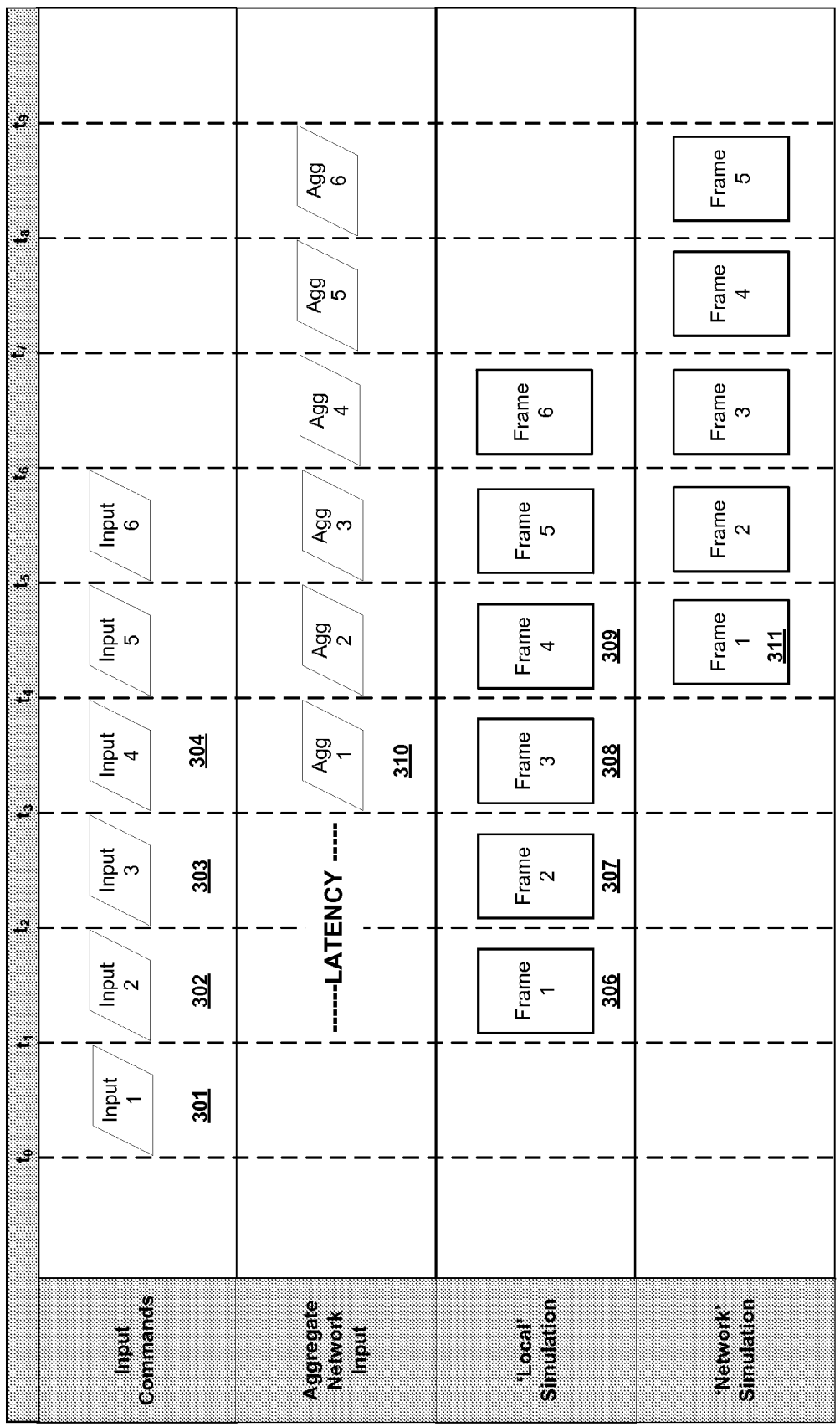
FIG. 3 illustrates a game command flow according to an embodiment of the present invention.

FIG. 3 illustrates an embodiment of a game command flow according to the present invention. A local and a network simulation are generated for each frame for game play. The local simulation provides a "real-time" gaming experience for the local game player. The local simulation may be generated for a frame using, for example, input packet 1 (301) for Frame 1 at time bucket $t_1$. Likewise, local simulations may be generated using input packet 2 (302) for Frame 2, input packet 3 (303) for Frame 3, and input packet 4 (304) for Frame 4 where $t_2$, $t_3$, and $t_4$, respectively, represent increasing time buckets. Moreover, the local simulation may also based on the state of remote game objects at a frame occurring in a previous time, which is determined by the latest network simulation. For example, the local simulations for Frame 1 (306), Frame 2 (307), and Frame 3 (308) are based on the input commands from input packet 1 (301), input packet 2 (302), and input packet 3 (303), respectively. The local simulations for the first three frames do not include state data for remote objects because network simulations are non-existent from $t_1$ thru $t_4$. In this embodiment, the first network simulation and corresponding state data for remote objects does not appear until $t_5$. On the other hand, Frame 4 (309) is based on the input packet 4 (304) and the last known state of the remote game objects, which in this example is network simulation of Frame 1 (311). Furthermore, the local simulation may also be generated based on the interaction data from the local simulation of the previous frame. As discussed, interaction data such as collision data, is proxied and is not resolved right away. As such, the proxied interaction data is resolved in the local simulation of the next frame. In this example, Frame 4 (309) may resolve the interaction/collision data generated during the local simulation for Frame 3 (308). If a collision is detected in Frame 3 (308), the resolution of the collision will be rendered and displayed at the local simulation of Frame 4 (309).

The network simulation in the game play is not rendered but enables synchronization checking as will be described. The network simulation is generated based on network input, which may include an aggregation of state (including checksum), interaction data, and input commands for every player within the network of game play for a frame. In one embodiment, network latency between $t_1$ and $t_3$ has caused a delay such that the network input commands are not received by the local node until $t_4$ where network input for Frame 1 (310) is received. The network simulation for Frame 1 (311) can then be generated at $t_5$ using the network input for Frame 1 (310). Synchronization checking may be performed anytime after both simulations for that frame is generated, whereby the state of the local object in the local simulation is compared to the state of the local object in the network simulation. For example, sync checking for Frame 1 may occur after $t_5$. The stored state of the local object at the local simulation for Frame 1 (306) may be compared to the state of the local object at the network simulation for Frame 1 (311). Where the states match, the network and local simulations are synchronized.

Figure 4:
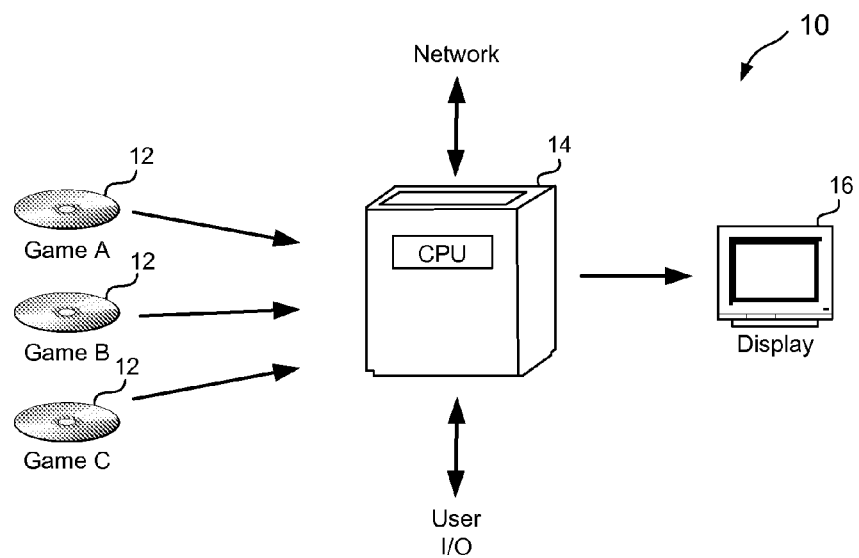
FIG. 4 illustrates a game system for providing one or more games for a user according to one embodiment of the present invention.

FIG. 4 illustrates a game system for providing one or more games for a user according to one embodiment of the present invention. System 10 is shown including one or more game media 12 (game A, game B, game C), a game device 14, and a display 16.

One or more game media 12 can include any game applications that may be used by game device 14 to involve a player in a game (and possibly also non-players who are also around). Each game medium 12 includes logic to provide a game, denoted as game A, game B, and game C. In one embodiment, the game provided by game device 14 is an electronic video game. Games are each individually stored on media, such as compact disk read-only memories (CDROMs), digital versatile disks (DVDs), game cartridges, or other storage media. A game, such as game A, is inserted in, coupled to, or in communication with game device 14 so that game device 14 may read all or part of a game application program code and/or related game data found on game media 12.

Game device 14 is a computing device that includes a processor, such as a CPU, and data storage combined or in separate elements. Game device 14 may be connected to a network that allows game device 14 to provide games that are not included on one or more game media 12. Thus, game A, game B, and game C may be accessed through the network and not be individually stored on game media 12. To allow a user to select from a plurality of available games, a display 16 might present a list of the games provided by game applications on game media 12. A game application may be also referred to as a game code and/or a game program. A game application should be understood to include software code that game device 14 uses to provide a game for a user to play. A game application might comprise software code that informs game device 14 of processor instructions to execute, but might also include data used in the playing of the game, such as data relating to constants, images and other data structures created by the game developer. A user interacts with the game application and game device 14 through user input/output (I/O) devices.

Display 16 is shown as separate hardware from game device 14, but it should be understood that display 16 could be an integral part of game device 14. It should also be understood that game media 12 could be an integral part of game device 14. Game media 12 might also be remote from game device 14, such as where game media is network storage that game device 14 accesses over a network connection to execute code stored on game media 12 or to download code from game media 12.

Figure 5:
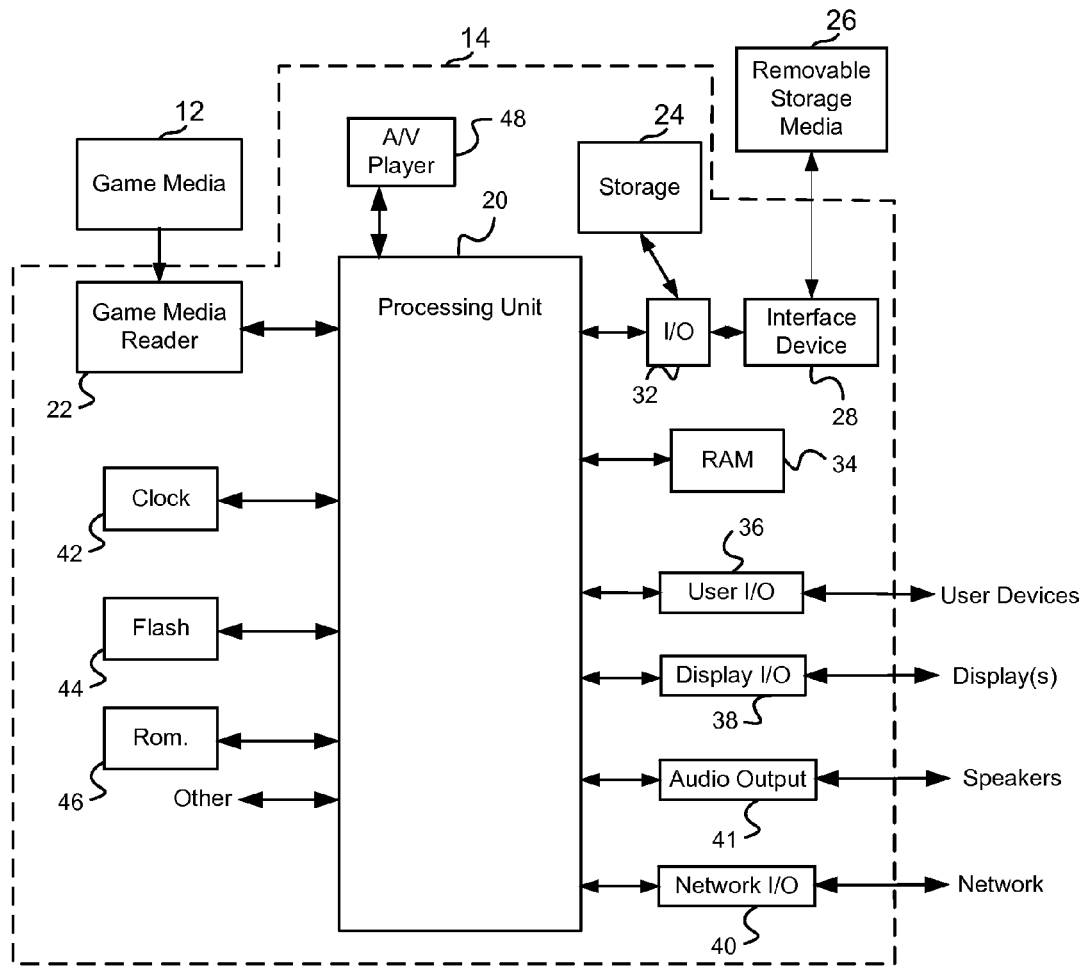
FIG. 5 illustrates a game device according to another embodiment of the present invention.

FIG. 5 illustrates another embodiment of a game device according to the present invention. It should be understood that other variations of game device 14 may be substituted for the examples explicitly presented herein and while the hardware might be essential to allow particular player interactivity, it is not essential to an implementation of the invention even if it is essential to the operation of it.

As shown, game device 14 includes a processing unit 20 that interacts with other components of game device 14 and also interacts with external components to game device 14. A game media reader 22 is included that communicates with game media 12. Game media reader 22 may be a CDROM or DVD unit that reads a CDROM, DVD, or any other reader that can receive and read data from game media 12.

Game device 14 also includes various components for enabling input/output, such as an I/O 32, a user I/O 36, a display I/O 38, and a network I/O 40. I/O 32 interacts with a storage 24 and, through an interface device 28, removable storage media 26 in order to provide storage for game device 14. Processing unit 20 communicates through I/O 32 to store data, such as game state data and any data files. In addition to storage 24 and removable storage media 26, game device 14 includes random access memory (RAM) 34. RAM 34 may be used for data that is accessed frequently, such as game code when a game is being played. In one embodiment, the aggregate network input received by the local game system from the network may be persisted in any one or more of storage components, including memory or mass storage components.

User I/O 36 is used to send and receive commands between processing unit 20 and user devices, such as game controllers. Display I/O 38 provides input/output functions that are used to display images from the game being played. Network I/O 40 is used for input/output functions for a network. Network I/O 40 may be used if a game is being played on-line or being accessed on-line. Audio output 41 comprises software and/or hardware to interface to speakers (such as desktop speakers, speakers integrated in game device 14, earphones, etc.). A game device might also have audio inputs (not shown).

Game device 14 also includes other features that may be used with a game, such as a clock 42, flash memory 44, read-only memory (ROM) 46, and other components. An audio/video player 48 might be present to play a video sequence such as a movie. It should be understood that other components may be provided in game device 14 and that a person skilled in the art will appreciate other variations of game device 14.

Figure 6:
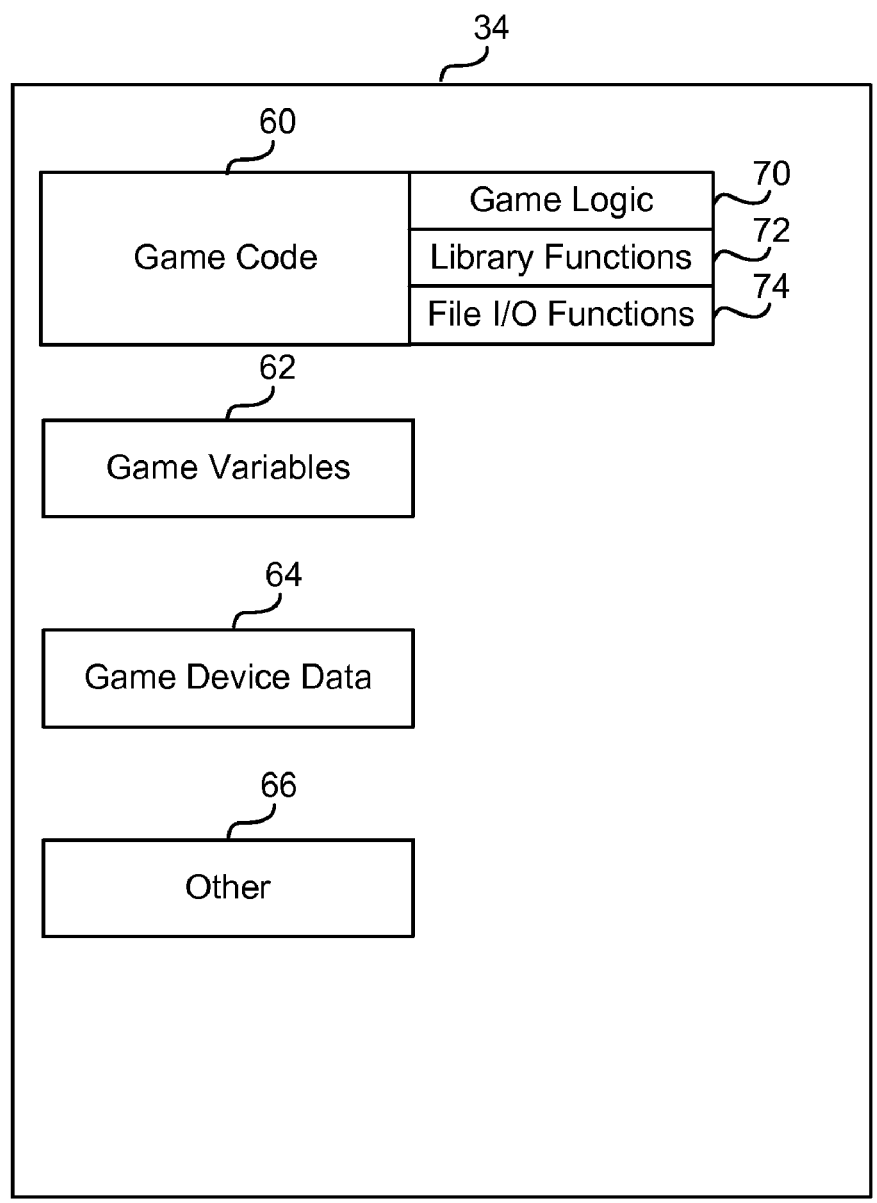
FIG. 6 illustrates an example of game variable memory as might be used in the game device shown in FIG. 5.

FIG. 6 illustrates an example of data that may be stored in RAM 34 to provide a game according to one embodiment of the present invention. For example, a game code 60, game variables 62, game device data 64, and other data 66 may be downloaded from game media 12 and stored in RAM 34. It will be understood that a person of skill in the art will appreciate other data that may be stored in RAM 34 that will enable game device 14 to provide the game.

Game code 60 may be any logic that is found on game media 12 that is used to provide a game, such as program code comprising a plurality of computer instructions. As shown, game code 60 includes game logic 70, library functions 72, and file I/O functions 74. Game logic 70 is used to provide any functions of the game. Library functions 72 include any functions that are used to support the game. File I/O functions 74 are used by processing unit 20 to perform input/output functions.

Game variables 62 are variables that are specific to a game and are used by processing unit 20 to provide variations of games for different users. The variables allow game device 14 to provide variations to the game based on actions by a user playing the game.

Game device data 64 is data specific to a game hardware that game code 60 is designed for. For example, different versions of game code 60 may be designed for different platforms supported by different game devices 14. Data specifically needed to operate game code 60 on a specific platform for a specific game device 14 may be included in game device data 64. Other data 66 may be any other data that is used with the game.

As a game found on game media 12 is played on game device 14, data regarding the state of the game and any other related aspect of the game may be generated. The game state data is then stored in storage, such as storage 24, removable storage media 26, RAM 34, or any other storage media accessible to game device 14. The game state data may then be used at another time by game device 14 to provide a game that is in the same state as when a user last played the game and saved its state. For example, the game state data may include data that allows a user to continue at a same level that the user has completed, data related to certain achievements that the user has accomplished, etc. It should be noted that the game state data does not necessarily start the game at the same exact place as the place when the game was last stopped but rather may start the game at a certain level or time related to when the game was last stopped or its state was saved.

Game variables might include, for example, view variables, character variables, selection variables, etc. View variables might include, for example, a view point, a view direction (or angle), a view rotation (or orientation), a view extent, cursor location(s), etc. Character variables might include, for example, an array of values for each character active in the game, state data on each character (e.g., name, health level, strength, possessions, alliances, type of character, etc.). Selection variables might include, for example, an array of selected objects.

As used herein, "object" is used to generally refer to logical units of a virtual game space. Examples of objects are trees, characters, clouds, buildings, backgrounds, buttons, tables, lights, etc. Each of these objects might be positioned in a virtual game space, typically a three-dimensional ("3D") space to emulate actual experience. Some objects are player-manipulable characters.

What is claimed is:

1. A method for improving perceived responsiveness of a networked interactive game system comprising at least one local game system and at least one remote game system, thereby allowing for distributed game play of an interactive game with improved perceived responsiveness at the local game system, wherein a display of game events is done with a series of game frames at least at the local game system, comprising:

intercepting a local input command from a local user of the at least one local game system before the local input command is sent to the at least one remote game system, wherein the local input command is generated in a present time phase by a local user of the local game system that controls a local object of the interactive game that is displayed in a first game frame in the present time phase;

determining state data of a remote object of the interactive game in a network simulation of a game frame preceding the first game frame, the network simulation determining interactions of nondeterministic objects from at least two game systems for use in at least one of game processing and display;

retrieving in the present time phase the state data of a remote object of the interactive game retrieving interaction data of the local object for a local simulation of a game frame immediately preceding the first game frame, wherein a local simulation at least determines interactions of objects in order to generate at least one of game processing and display for use at the local game system; and generating a local simulation in the present time phase of the first game frame by combining data from the local input command for the first game frame, the state data of a remote object, and the interaction data.

2. The method of claim 1, further comprising:
determining interaction data of the local object for the local simulation of the first game frame by performing collision detection between the local object and the remote object during generation of the local simulation of the first game frame; and responding to the interaction data of the local object for the local simulation of the first game frame during generation of a local simulation of a subsequent game frame, thus deferring collision processing for at least one game frame.

3. The method of claim 1, further comprising:
receiving a network input for the first game frame, the network input including aggregated state data for the local object and the remote object for the first game frame, interaction data for the local object and the remote object for the first game frame, and input commands for the local object and the remote object for the first frame; and generating a network simulation of the first game frame based on the network input, usable at least for determining state data for subsequent game frames.

4. The method of claim 3, further comprising:
disabling collision detection between the local object and the remote object prior to generating the network simulation of the first game frame.

5. The method of claim 1, further comprising:
determining if a state of the local object for the local simulation of the first game frame is synchronized with the state of the local object for the network simulation of the first game frame.

6. The method of claim 1, further comprising:
determining a local checksum based on a state of the local object for the local simulation of the first game frame;
determining a network checksum based on a state of the local object for the network simulation of the first game frame;
comparing the local checksum and the network checksum; and
determining whether the state of the local object for the local simulation of the first game frame is synchronized with the state of the local object for the network simulation of the first game frame based on whether the local checksum and the network checksum match as a result of the comparison.

7. The method of claim 1, further comprising:
rendering on the local game system a local simulation of the local object for the first game frame and a network simulation of the remote object for the previous game frame.

8. The method of claim 1, further comprising:
displaying on a display of the local game system in real-time the local simulation of the local object for the first game frame and a network simulation of the remote object for the previous game frame.

9. The method of claim 1, wherein the local game system and the remote game systems are connected using a peer-to-peer network.

10. The method of claim 1, wherein the interaction data of the local object for the local simulation of the previous game frame includes peer-to-peer collision data.

11. An apparatus for improving perceived responsiveness of a networked interactive game system comprising at least one local game system and at least one remote game system, thereby allowing for distributed game play of an interactive game with improved perceived responsiveness at the local game system, wherein a display of game events is done with a series of game frames at least at the local game system, the apparatus comprising:

a command proxy configured to intercept a local input command from a local user of the at least one local game system before the local input command is sent to the at least one remote game system, wherein the local input command is generated in a present time phase by a local user of the local game system that controls a local object of the interactive game that is displayed in a first game frame in the present time phase; and a processor configured to determine state data of a remote object of the interactive game in a network simulation of a game frame preceding the first game frame, the network simulation determining interactions of nondeterministic objects from at least two game systems for use in at least one of game processing and display, retrieve in the present time phase the state data of a remote object of the interactive game, retrieve interaction data of the local object for a local simulation of a game frame immediately preceding the first game frame, wherein a local simulation at least determines interactions of objects in order to generate at least one of game processing and display for use at the local game system, and generate a local simulation in the present time phase of the first game frame of the interactive game by combining data from the local input command for the first game frame, the state data of a remote object, and the interaction data.

12. The apparatus of claim 11, wherein the processor is further configured to:
determine interaction data of the local object for the local simulation of the first game frame by performing collision detection between the local object and the remote object during generation of the local simulation of the first game frame; and respond to the interaction data of the local object for the local simulation of the first game frame during generation of a local simulation of a subsequent game frame, thus deferring collision processing for at least one game frame.

13. The apparatus of claim 11, further comprising:
a simulation controller configured to receive a network input for the first game frame, the network input including aggregated state data for the local object and the remote object for the first game frame, interaction data for the local object and the remote object for the first game frame, and input commands for the local object and the remote object for the first game frame, and wherein the processor is further configured to generate a network simulation of the first game frame based on the network input, usable at least for determining state data for subsequent game frames.

14. The apparatus of claim 13, wherein the processor is further configured to disable collision detection between the local object and the remote object prior to generating the network simulation of the first game frame.

15. The apparatus of claim 11, further comprising:
a synchronization checking system configured to:
determine a local checksum based on a state of the local object for the local simulation of the first game frame;
determine a network checksum based on a state of the local object for the network simulation of the first game frame;
compare the local checksum and the network checksum; and
determine whether the state of the local object for the local simulation of the first game frame is synchronized with the state of the local object for the network simulation of the first game frame based on whether the local checksum and the network checksum match as a result of the comparison.

16. A computer program product stored on a non-transitory computer-readable medium for improving perceived responsiveness of a networked interactive game system comprising at least one local game system and at least one remote game system, thereby allowing for distributed game play of an interactive game with improved perceived responsiveness at the local game system, wherein a display of game events is done with a series of game frames at least at the local game system, the computer program product comprising:
code for intercepting a local input command from a local user of the at least one local game system before the local input command is sent to the at least one remote game system, wherein the local input command is generated in a present time phase by a local user of the local game system that controls a local object of the interactive game that is displayed in a first game frame in the present time phase;
code for determining state data of a remote object of the interactive game in a network simulation of a game frame preceding the first game frame;
code for retrieving in the present time phase the state data of a remote object of the interactive game;
code for retrieving interaction data of the local object for a local simulation of a game frame immediately preceding the first game frame, wherein a local simulation at least determines interactions of objects in order to generate at least one of game processing and display for use at the local game system; and
code for generating a local simulation in the present time phase of the first game frame by combining data from the local input command for the first game frame, the state data of a remote object, and the interaction data.

17. The computer program product according to claim 16, further comprising:
code for determining interaction data of the local object for the local simulation of the first game frame by performing collision detection between the local object and the remote object during generation of the local simulation of the first game frame; and
code for responding to the interaction data of the local object for the local simulation of the first game frame during generation of a local simulation of a subsequent game frame, thus deferring collision processing for at least one game frame.

18. The computer program product according to claim 16, further comprising:
code for receiving a network input for the first game frame, the network input including aggregated state data for the local object and the remote object for the first game frame, interaction data for the local object and the remote object for the first game frame, and input commands for the local object and the remote object for the first frame; and
code for generating a network simulation of the first game frame based on the network input, usable at least for determining state data for subsequent game frames.

19. The computer program product according to claim 18, further comprising:
code for disabling collision detection between the local object and the remote object prior to generating the network simulation of the first game frame.

20. The computer program product according to claim 16, further comprising:
code for determining a local checksum based on a state of the local object for the local simulation of the first game frame;
code for determining a network checksum based on a state of the local object for the network simulation of the first game frame;
code for comparing the local checksum and the network checksum; and
code for determining whether the state of the local object for the local simulation of the first game frame is synchronized with the state of the local object for the network simulation of the first game frame based on whether the local checksum and the network checksum match as a result of the comparison.

* * * * *